(12) United States Patent
Ohkubo

(10) Patent No.: US 7,283,458 B2
(45) Date of Patent: Oct. 16, 2007

(54) OPTICAL INFORMATION RECORDING MEDIUM, AND METHOD AND DEVICE FOR OPTICAL INFORMATION RECORDING/REPRODUCTION USING SAME

(75) Inventor: Shuichi Ohkubo, Tokyo (JP)

(73) Assignee: NEC Corporation (JP)

( * ) Notice: Subject to any disclaimer, the term of this patent is extended or adjusted under 35 U.S.C. 154(b) by 381 days.

(21) Appl. No.: 10/510,460

(22) PCT Filed: Apr. 8, 2003

(86) PCT No.: PCT/JP03/04438

§ 371 (c)(1),
(2), (4) Date: Oct. 6, 2004

(87) PCT Pub. No.: WO03/085658

PCT Pub. Date: Oct. 16, 2003

(65) Prior Publication Data

US 2005/0147021 A1    Jul. 7, 2005

(30) Foreign Application Priority Data

Apr. 8, 2002   (JP) ............................. 2002-105106

(51) Int. Cl.
G11B 7/24   (2006.01)
(52) U.S. Cl. ............... 369/275.4; 369/280; 369/112.01
(58) Field of Classification Search ............. 369/275.1, 369/275.2, 275.3, 275.4, 275.5, 112.01, 283, 369/288, 280, 277
See application file for complete search history.

(56) References Cited

U.S. PATENT DOCUMENTS 6,355,326 B1   3/2002   Lee et al. ................. 428/64.1

2005/0232119 A1 *  10/2005  Ohkubo .................. 369/112.01

FOREIGN PATENT DOCUMENTS

JP   57-050330   3/1982

(Continued)

OTHER PUBLICATIONS

Untranslated Office Action issued by Chinese Patent Office on Aug. 4, 2006 in connection with corresponding Chinese patent application No. 200510080234.4.
English translation of relevant parts of Examiner's comments in Japanese translation of-date Chinese Office Action submitted in lieu of statement of relevancy of prior art to present invention.

(Continued)

*Primary Examiner*—Ali Neyzari
(74) *Attorney, Agent, or Firm*—Ostrolenk, Faber, Gerb & Soffen, LLP

(57) ABSTRACT

A recording layer (2) and a light-transmitting layer (3) are provided on a substrate (1) having a guide groove for tracking a light beam projected in a spot for information recording/reproduction. The spot light beam is projected onto the recording layer (2) through the light-transmitting layer (3) so as to record information in a first portion (G') of the recording layer corresponding to the inside (G) of the guide groove and a second portion (L') of the recording layer corresponding to a flat portion (L) between adjacent guide grooves. The depth d of the first portion (G') with respect to the second portion (L') on the light-transmitting layer side of the recording layer (2) satisfies the relation $\lambda/5.8nf \leq d \leq \lambda/5nf$ where $\lambda$ is the wavelength of the light and nf is the index of refraction of the light-transmitting layer (3) to the wavelength $\lambda$. The reflectance of the recording layer (2) after the recording is larger than that before the recording.

16 Claims, 3 Drawing Sheets

FOREIGN PATENT DOCUMENTS

| | | |
|---|---|---|
| JP | 8-273204 | 10/1996 |
| JP | 09-073665 | 3/1997 |
| JP | 10-064120 | 7/1997 |
| JP | 08-218682 | 3/1998 |
| JP | 10-064120 | 3/1998 |
| JP | 2001-046778 | 2/2001 |
| JP | 2002-008269 | 1/2002 |
| JP | 2002-074741 | 3/2002 |

OTHER PUBLICATIONS

English translation of Chinese Office Action issued on Aug. 4, 2006 in connection with corresponding Chinese patent application No. 200510080234.4.

Untranslated Office Action issued by Chinese Patent Office on Jul. 21, 2006 in connection with corresponding Chinese patent application No. 03807950.X.

English translation of Chinese Office Action issued on Jul. 21, 2006 in connection with corresponding Chinese patent application No. 03807950.X.

* cited by examiner

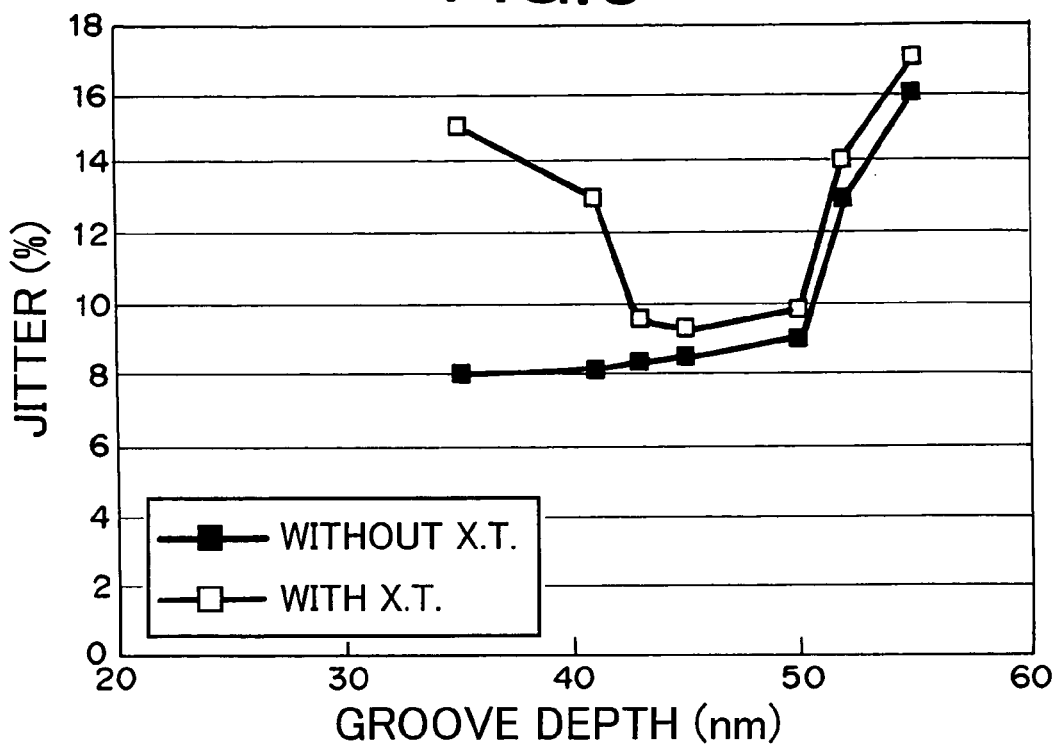
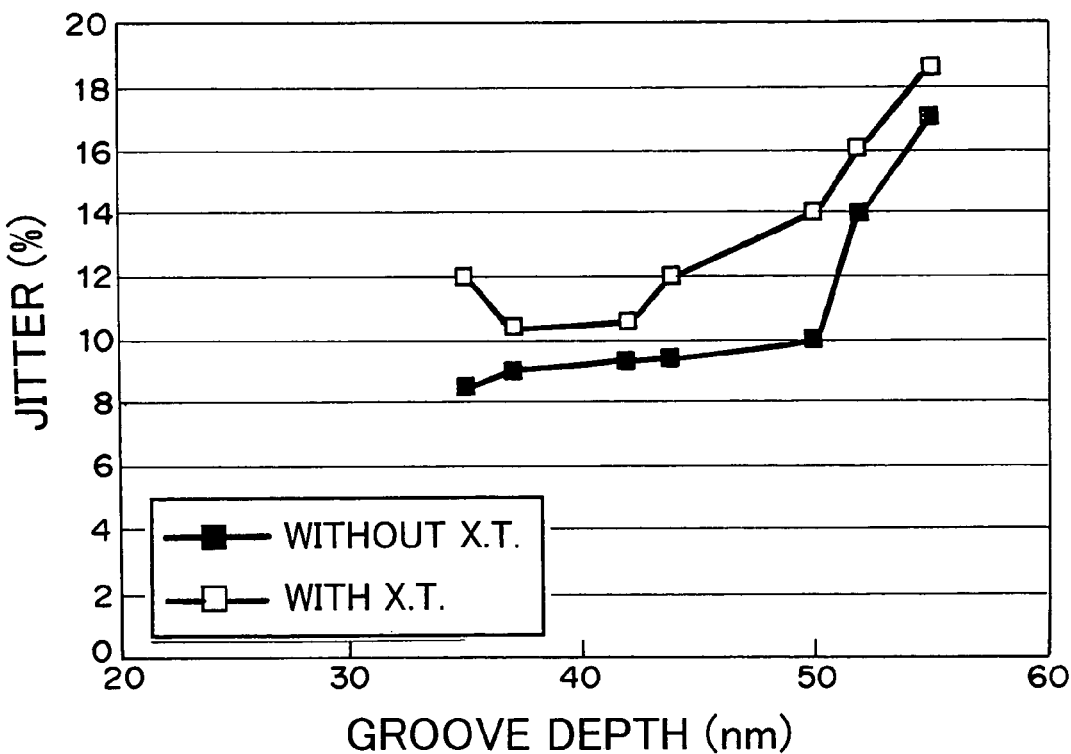

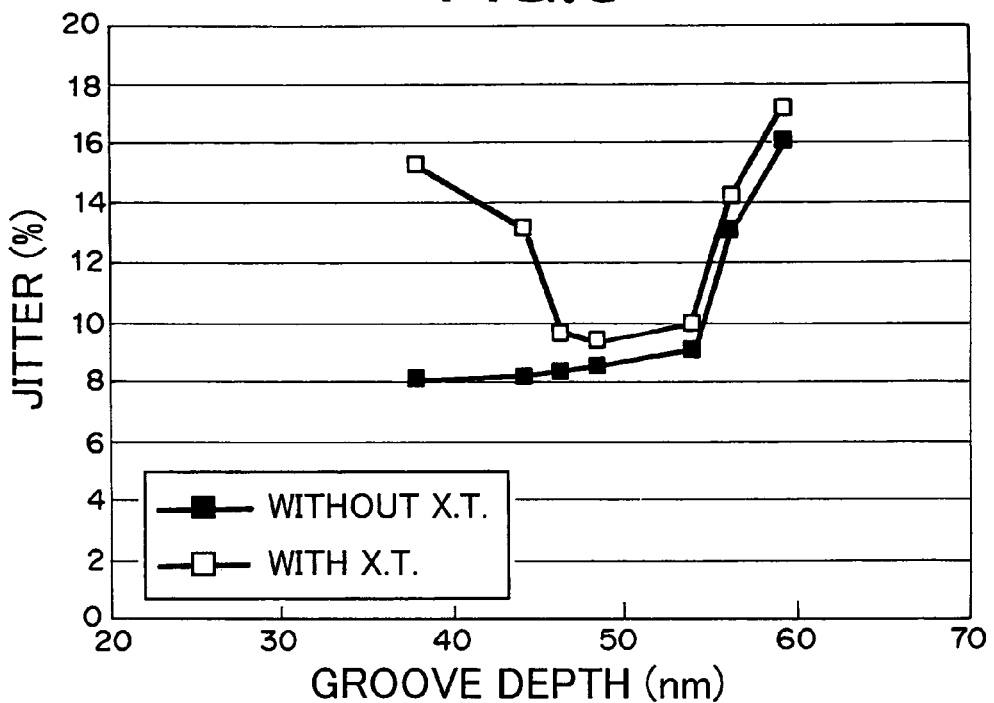
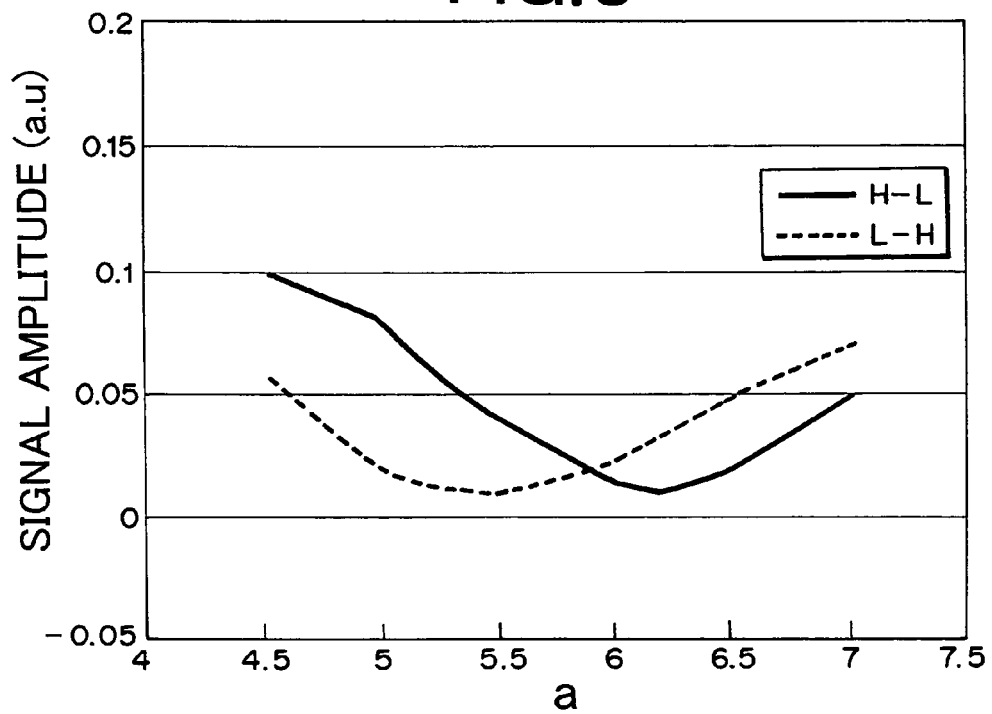

OPTICAL INFORMATION RECORDING MEDIUM, AND METHOD AND DEVICE FOR OPTICAL INFORMATION RECORDING/REPRODUCTION USING SAME

CROSS REFERENCE TO RELATED APPLICATION

This is a U.S. National stage of application No. PCT/JP03/04438, filed on 8 April 2003. Priority is claimed on that application and on the following application:
Country: Japan, Application No. 2002-105106, Filed: 8 Apr. 2002
The PCT International application was published in the Japanese language.

TECHNICAL FIELD

The present invention relates to an optical information recording medium with respect to which information is recorded/reproduced using light such as laser light, further to an optical information recording/reproducing method and an optical information recording/reproducing device using the medium, particularly to an optical information recording medium in which information is recorded both in a portion corresponding to the inside of a guide groove for tracking and a portion corresponding to a portion between adjacent guide grooves with respect to a recording layer disposed on the surface of a substrate having a guide groove for tracking, and a method and device for optical information recording/reproducing using the medium.

BACKGROUND ART

As optical information recording mediums for use in recording/reproducing information by irradiation with laser light, a magnetic optical disk (MO) or CD-R, or CD-RW, DVD-R, DVD-RAM, DVD-RW and the like have been generally known. As means for raising recording densities in the optical information recording mediums, land/groove recording has been known in which the recording is performed in recording layer portions corresponding to both a flat portion (land) between adjacent guide grooves for tracking, the guide grooves being formed into substantially circular shapes in parallel with one another in a substrate surface, and the inside of each guide groove (JP(A)-57-50330, JP(A)-9-73665, JP(A)-9-198716, JP(A)-10-64120 and the like).

Moreover, in recent years, as a method of raising a recording density, a technique has been proposed in which NA of an objective lens of an optical head constituting a device for recording/reproducing information is raised to about 0.85. When the NA is raised, a beam diameter in condensing laser light can be reduced, and therefore it is possible to record/reproduce a finer mark. When the NA is raised in this manner, instead of applying the laser light from the side of a support substrate having a thickness of 0.6 to 1.2 mm as in a conventional technique, a light-transmitting layer having a thickness of about 0.1 mm is formed on the surface of the optical information recording medium in which the guide groove for tracking is formed, and the laser light can be applied from the side of the light-transmitting layer to record/reproduce information.

Moreover, the raising of the recording density by shortening of a wavelength of a laser light source has also been intensively studied. It has been expected that three times or higher recording density be realized by use of a bluish-purple semiconductor laser having a wavelength of around 405 nm as compared with a red semiconductor laser for use in recording/reproducing a conventional DVD.

On the other hand, to improve a signal quality of the optical information recording medium, a low-to-high (L-H) recording system is effective in which reflectance of the recording layer before the recording is lowered in such a manner as to raise the reflectance of the recording layer after the recording. In this system, since the reflectance of the recording layer before the recording is lowered beforehand, a modulation degree can be raised, and therefore C/N can be raised as compared with a conventional high-to-low (H-L) recording system for use in DVD-RAM or DVD-RW, whose reflectance of the recording layer after the recording lowers.

It is considered that these techniques are combined, that is, the land/groove recording is performed with respect to the optical information recording medium of the L-H system having a high signal quality, using a short-wavelength light source such as a bluish-purple semiconductor laser, and an optical head having a high NA, so that the recording density is significantly increased.

Additionally, one of large technique problems in performing the land/groove recording is leakage of a signal from an adjacent track, so-called crosstalk. When a pitch of the guide groove for tracking is reduced in order to increase the recording density, crosstalk components from information recorded in the adjacent track are increased, and it is therefore difficult to correctly reproduce the information in a target track (self track).

DISCLOSURE OF THE INVENTION

One of objects of the present invention is to provide an optical information recording medium of an L-H system having a high signal quality, capable of performing high-density land/groove recording in which a crosstalk from an adjacent track is suppressed even in using a short-wavelength light source or a high-NA optical head.

Moreover, another object of the present invention is to provide a method and a device for recording/reproducing optical information using the optical information recording medium.

In order to attain the above object, according to the present invention, there is provided an optical information recording medium in which light is projected in a spot to thereby record/reproduce information and in which at least a recording layer and a light-transmitting layer are disposed in this order on a substrate having a guide groove for tracking of the spotted light and in which the light is projected in the spot to the recording layer from the side of the light-transmitting layer to record the information both in a first portion of the recording layer corresponding to the inside of the guide groove and a second portion of the recording layer corresponding to a flat portion between mutually adjacent guide grooves, wherein assuming that a wavelength of the light is $\lambda$, and an index of refraction of the light-transmitting layer in the wavelength $\lambda$ is nf, a depth d of the first portion with respect to the second portion in the surface of the recording layer on the side of the light-transmitting layer satisfies a relation of $\lambda/5.8\, nf \leq d \leq \lambda/5\, nf$, and a reflectance of the recording layer after the recording is larger than that before the recording.

In an aspect of the present invention, the depth d is substantially equal to a depth of the inside of the guide groove with respect to the flat portion between the guide grooves. In an aspect of the present invention, a dielectric layer exists between the substrate and the recording layer. In an aspect of the present invention, a reflective film exists between the substrate and the dielectric layer. In an aspect of the present invention, a dielectric layer exists between the recording layer and the light-transmitting layer.

In order to attain the above object, according to the present invention, there is also provided an optical information recording medium in which light is projected in a spot to thereby record/reproduce information and in which at least a recording layer is disposed on a substrate having a guide groove for tracking of the spotted light and in which the light is projected in the spot to the recording layer from the side of the substrate to record the information both in a first portion of the recording layer corresponding to the inside of the guide groove and a second portion of the recording layer corresponding to a flat portion between mutually adjacent guide grooves, wherein assuming that a wavelength of the light is λ, and an index of refraction of the substrate in the wavelength λ is ns, a depth D of the second portion with respect to the first portion in the surface of the recording layer on the side of the substrate satisfies a relation of $\lambda/5.8$ ns $\leq D \leq \lambda/5$ ns, and a reflectance of the recording layer after the recording is larger than that before the recording.

In an aspect of the present invention, the depth D is substantially equal to a depth of the inside of the guide groove with respect to the flat portion between the guide grooves. In an aspect of the present invention, a reflective film exists on the side of the recording layer opposite to the substrate. In an aspect of the present invention, a dielectric layer exists between the substrate and the recording layer.

In order to attain the above object, according to the present invention, there is also provided an optical information recording medium in which light is projected in a spot to thereby record/reproduce information and in which at least a recording layer is disposed on a substrate having a guide groove for tracking of the spotted light and in which the information is recorded both in a first portion of the recording layer corresponding to the inside of the guide groove and a second portion of the recording layer corresponding to a flat portion between mutually adjacent guide grooves, wherein assuming that: a quantity of reflected light at a time when the light is applied to a non-recording region in which alternate arrangement of the guide groove and the flat portion between the guide grooves is not formed is $I_1$; and quantities of the reflected light at a time when the light is applied to a portion corresponding to the inside of the guide groove and a portion corresponding to the flat portion between the guide grooves in an information non-recorded state on the same conditions are $I_2$ and $I_3$, respectively, a value of $R=0.5(I_2+I_3)/I_1$ is 0.55 to 0.7, and a reflectance of the recording layer after the recording is larger than that before the recording.

In an aspect of the present invention, a dielectric layer exists between the substrate and the recording layer, and a reflective film exists between the substrate and the dielectric layer. In an aspect of the present invention, a dielectric layer exists on the side of the recording layer opposite to the substrate, and a reflective film exists on the side of the dielectric layer opposite to the recording layer.

In order to attain the above object, according to the present invention, there is also provided an optical information recording/reproducing method having the step of projecting-light having a wavelength of 390 to 440 nm in a spot to both a first portion and a second portion of a recording layer of the above optical information recording medium using an objective lens having a numerical aperture of 0.8 to 0.9 to thereby record/reproduce information.

In order to attain the above object, according to the present invention, there is also provided an optical information recording/reproducing device having an optical head which projects light in a spot to both a first portion and a second portion of a recording layer of the above optical information recording medium, the optical head having a semiconductor laser which emits light having a wavelength of 390 to 440 nm and an objective lens having a numerical aperture of 0.8 to 0.9.

It has heretofore been known well that when a groove depth is changed, the crosstalk in the land/groove recording changes. The present inventor has found that in the L-H recording system, the groove depth capable of reducing the crosstalk differs from that in the H-L recording system. FIG. 6 shows a relation between the groove depth and the crosstalk. In FIG. 6, the abscissa indicates a value of "a" in a case where the groove depth is represented by $\lambda/(a \bullet n)$ assuming that the wavelength of laser light is λ and an index of refraction of a light-transmitting layer or a substrate existing on an incidence side of the laser light with respect to a recording layer is n, and the ordinate indicates an amplitude of a crosstalk signal. This means that the groove depth increases as "a" decreases. As shown in FIG. 6, the groove depth capable of reducing the crosstalk is larger in the L-H system as compared with the H-L system. However, when the groove depth is increased, noises of the substrate remarkably increase. Therefore, even when the crosstalk can be suppressed, a signal quality in a target track (self track) drops, and high-density recording cannot be performed. When the groove depth is selected from the above-described proper range, that is, the value of "a" in FIG. 6 is set into a range of 5 to 5.8, the signal quality of the self track necessary for the high-density recording is secured, the crosstalk from the adjacent track is suppressed, and a recording capacity can be increased.

BRIEF DESCRIPTION OF THE DRAWINGS

FIG. 3 is a diagram showing one example of a jitter characteristic of the optical information recording medium according to the present invention;

FIG. 4 is a diagram showing one example of the jitter characteristic of the optical information recording medium whose reflectance drops after recording;

FIG. 5 is a diagram showing one example of the jitter characteristic of the optical information recording medium according to the present invention; and FIG. 6 is a diagram showing a relation between a groove depth and crosstalk of the optical information recording medium.

BEST MODE FOR CARRYING OUT THE INVENTION

An embodiment of the present invention will be described hereinafter with reference to the drawings.

Figure 1:
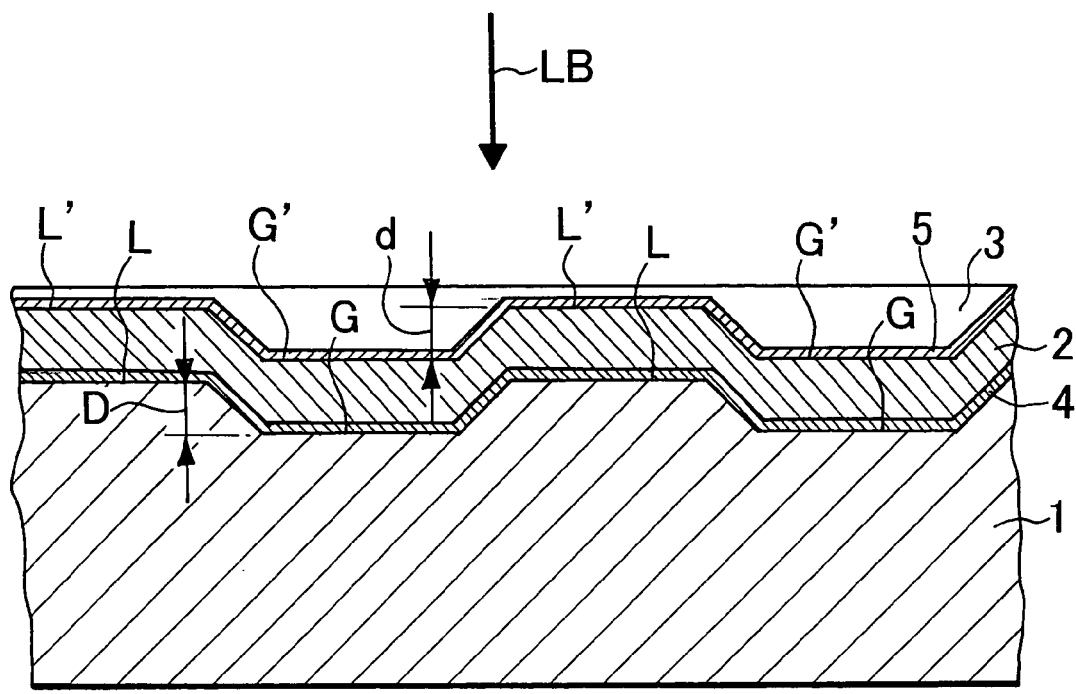
FIG. 1 is a partially enlarged sectional view of an optical information recording medium according to the present invention.

FIG. 1 is a partially enlarged sectional view showing one embodiment of an optical information recording medium according to the present invention. Guide grooves for tracking, extended in substantially circular shapes around a substrate center, are formed in the surface (upper surface) of a disc-shaped support substrate 1 having a thickness of around 1.2 mm, and a flat portion (land) L is formed between mutually adjacent guide grooves. The inside (bottom portion) of the guide groove for tracking is especially shown as a groove G. A depth (groove depth) of the groove G to the land L is D. A width of the land L is typically substantially equal to that of the groove G preferably within an error of 10%. Moreover, an arrangement pitch of the groove G is, for example, 0.5 to 1.2 μm.

A dielectric layer 4 is formed on the upper surface of the substrate 1, a recording layer 2 in which optical information is recorded is formed on the dielectric layer 4, a dielectric layer 5 is formed on the recording layer 2, and a light-transmitting layer 3 having an index nf of refraction is formed on the dielectric layer 5. Laser light LB is applied from a light-transmitting layer 3 side, and information is recorded/reproduced with respect to the recording layer 2. Materials such as polycarbonate (PC) and aluminum (Al) can be used for the substrate 1. The recording layer 2 has a thickness of about 0.1 mm, and may be a film of PC bonded by an ultraviolet cured resin or the like, or a layer formed of the ultraviolet cured resin having a thickness of about 0.1 mm. In case of the film of PC bonded, the thickness of the PC film is very large as compared with that of an ultraviolet cured resin bonding layer, and therefore the index of refraction of the PC film may be used as the index nf of refraction of the light-transmitting layer 3.

For the recording layer 2, a material whose optical reflectance or phase changes by irradiation with the laser light, for example, a known phase change type recording material such as GeSbTe, a known photo refractive material or the like can be used. The recording layer 2 has a concave/convex shape corresponding to a land/groove shape of the surface of the substrate 1, and a portion (i.e., first portion) G' corresponding to the substrate groove G, and a portion (i.e., second portion) L' corresponding to the substrate land L are formed. A depth (groove depth) of the portion G' corresponding to the groove with respect to the portion L' corresponding to the land in the upper surface of the recording layer 2 is d. Typically, the thickness of the recording layer 2 in the portion L' corresponding to the land is equal to that in the portion G' corresponding to the groove. Furthermore, since the thicknesses of the dielectric layers 4, 5 in the portion corresponding to the land are similarly equal to those in the portion corresponding to the groove, the above-described groove depth d is substantially equal to D. Here, the groove depth d is selected in such a manner as to establish $\lambda/5.8\, nf \leq d \leq \lambda/5\, nf$ assuming that a wavelength of the irradiation laser light is $\lambda$. The thickness of the recording layer 2 is, for example, 10 to 30 nm, preferably 10 to 20 nm. In addition to functions of protective layers, the dielectric layers 4, 5 also have functions capable of realizing a recording medium of an L-H system, when a layer constitution (including the thicknesses of the dielectric layers 4, 5) including these layers is appropriately set.

If necessary, a metal layer as a reflective film may be provided between the upper surface of the substrate 1 and the dielectric layer 4.

The information is recorded/reproduced with respect to both the portion G' corresponding to the groove and the portion L' corresponding to the land of the recording layer 2 in the L-H recording system. To realize the L-H recording system, the respective layers, the film thicknesses, and other layer constitutions are appropriately set in accordance with a known design method.

Figure 2:
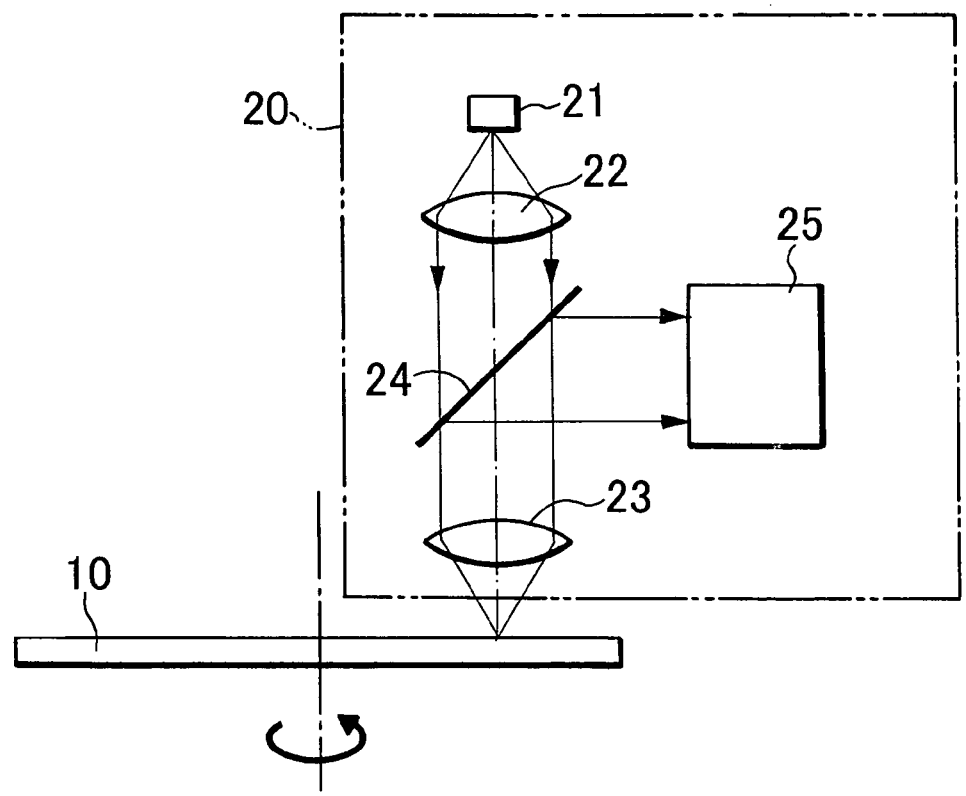
FIG. 2 is a schematic diagram showing a method and a device for recording/reproducing information with respect to the optical information recording medium according to the present invention.

FIG. 2 is a schematic diagram showing a method and a device for recording/reproducing the information with respect to the above-described optical information recording medium. An optical information recording medium 10 rotates around a rotation center of a vertical direction passing through the center of the medium. An optical head 20 constituting a recording/reproducing device is disposed above the recording medium 10. In the optical head 20, the laser light emitted from a semiconductor laser 21 which is a light source is applied in a spot shape to the portion G' corresponding to the groove or the portion L' corresponding to the land of the recording layer 2 of the recording medium 10 through a collimate lens 22 and an objective lens 23. The reflected light from the recording medium 10 reaches an optical detection system 25 via the objective lens 23 and a beam splitter 24. A reproduction signal, a tracking signal or the like is obtained by the optical detection system 25. A wavelength $\lambda$ of the laser light applied from the semiconductor laser 21 is, for example, 390 to 680 nm, preferably 390 to 440 nm. As the objective lens 23, a lens having a large numerical aperture (NA), for example, of 0.6 to 0.9, preferably 0.8 to 0.9 is used.

It is to be noted that the present invention is not limited to the application of the laser light from the side of the light-transmitting layer 3, and the laser light may be applied from the side of the substrate 1. In this case, a light-transmitting substrate is used as the substrate 1. Since the thickness of the dielectric layer 4 of the portion corresponding to the land L is typically equal to that of the portion corresponding to the groove G as described above, the depth (groove depth) of the portion L' corresponding to the land to the portion G' corresponding to the groove is substantially D. The groove depth D is selected in such a manner as to establish $\lambda/5.8\, ns \leq D \leq \lambda/5\, ns$ assuming that a wavelength of the irradiation laser light is $\lambda$ and an index of refraction of the substrate 1 is ns. When the reflective layer is formed, the layer is disposed on the recording layer 2 via the dielectric layer 5. Also in this case, the information is recorded/reproduced with respect to both the portion G' corresponding to the groove and the portion L' corresponding to the land of the recording layer 2 in the L-H recording system.

Next, still another embodiment of the present invention will be described. In the above-described embodiment, the relation between the groove depth and the index of refraction of the light-transmitting layer or the substrate has been specified, and in the present embodiment, a quantity of reflected light of irradiation light is specified in a plurality of predetermined places of the recording medium. Accordingly, it is possible to record/reproduce with satisfactory jitter characteristics.

Concretely, in the present embodiment, assuming that: the quantity of the reflected light is $I_1$ at a time when the laser light is applied in a spot to the recording layer in a non-recording region (e.g., region positioned inside or outside of a diametric direction with respect to an information recording region) having a layer constitution equivalent to that of an information recording region in which the structure of alternate arrangement of the lands/grooves of the recording medium 10 is formed as shown in FIG. 1, and having a uniform flat portion formed in a sufficiently broad region as compared with a light beam spot diameter without any alternate arrangement of the lands/grooves; and quantities of the reflected light are $I_2$ and $I_3$ at a time when the laser light is applied in the spots to the portion corresponding to the groove and the portion corresponding to the land, respectively, of the recording layer of the information recording region in an information non-recorded state on the same conditions, a value of $R=0.5(I_2+I_3)/I_1$ is 0.55 to 0.7. It has been found that this is effective in realizing satisfactory jitter characteristics. R is preferably 0.6 to 0.7.

Here, as the quantity of the reflected light in the information recording region, an average value of the quantities of the reflected light from the portion corresponding to the groove and the portion corresponding to the land is adopted. A main reason for this is that a case where the width of the groove is different from that of the land has been considered. In the land/groove recording, the width of the groove is equal to that of the land, and the value of $I_2$ is substantially equal to that of $I_3$. This is typical, but there is also a case where the width of the groove is different from that of the land and the value of $I_2$ is different from that of $I_3$ because of a manufacturing error and the like, and this case is handled.

According to the present embodiment, instead of the relation between the groove depth and the index of refraction of the light-transmitting layer or the substrate, a relation between the quantities of the reflected light in a plurality of places where the measuring is simple is defined, and accordingly a similar function/effect can be exerted.

The present invention will be further described hereinafter in accordance with examples.

EXAMPLE 1

A disc-shaped PC substrate having a thickness of 1.1 mm was used as a substrate, a 100 nm thick Al reflective film, a 40 nm thick ZnS—SiO$_2$ dielectric layer, a 15 nm thick GeSbTe recording layer, and a 100 nm thick ZnS—SiO$_2$ dielectric layer were stacked in order by sputtering, respectively, and a recording medium (disk) was obtained. It is to be noted that a substrate whose pitch of a guide groove was 0.56 μm and whose depth of the guide groove was 35 nm to 55 nm was used as the PC substrate. Furthermore, a 0.1 mm thick PC film was bonded by an ultraviolet cured resin. An index (nf) of refraction of the PC film in a wavelength of 400 nm was 1.6.

After initializing (crystallizing) the disk, the disk was rotated at a linear speed of 5.1 m/s, laser light was applied from the side opposite to that of the substrate using an optical head comprising a laser light source having a wavelength (λ) of 400 nm and an objective lens having NA=0.85, and land/groove recording was performed on a linear density condition of 0.116 λm/bit in an L-H recording system to measure jitters. In the disk, a reflectance before the recording (information non-recorded state) was 6%, and that after the recording (information recorded state) was 20%.

Measurement results of the jitters are shown in FIG. 3. FIG. 3 shows both a jitter in a case where data is not recorded in an adjacent track (shown as without X.T.) and a jitter in a case where the data is recorded in the adjacent track (shown as with X.T.). The jitter in the self track in a case where the adjacent track is not recorded and there is not any crosstalk is satisfactory, when a groove depth is smaller. When the depth is larger than 50 nm, noises attributed to the substrate increase, and therefore the jitter in the self track is remarkably deteriorated. On the other hand, in a case where the adjacent track is also recorded, when the groove depth is smaller than 43 nm, the jitter is remarkably deteriorated by an influence of the crosstalk. When the groove depth is set in a range of 43 to 50 nm, that is, in a range of λ/5.8 nf or more and λ/5 nf or less, it is possible to obtain satisfactory jitter characteristics including the crosstalk.

Comparative Example 1

A disc-shaped PC substrate having a thickness of 1.1 mm was used as a substrate, a 100 nm thick Al reflective film, a 15 nm thick ZnS—SiO$_2$ dielectric layer, a 15 nm thick GeSbTe recording layer, and a 45 nm thick ZnS—SiO$_2$ dielectric layer were stacked in order by sputtering, respectively, and a recording medium (disk) was obtained. It is to be noted that a substrate whose pitch of a guide groove was 0.56 μm and whose depth of the guide groove was 35 nm to 55 nm was used as the PC substrate. Furthermore, a 0.1 mm thick PC film was bonded by an ultraviolet cured resin. An index of refraction of the PC film in a wavelength of 400 nm was 1.6.

After initializing (crystallizing) the disk, the disk was rotated at a linear speed of 5.1 m/s, laser light was applied from the side opposite to that of the substrate using an optical head comprising a laser light source having a wavelength of 400 nm and an objective lens having NA=0.85, and land/groove recording was performed on a linear density condition of 0.116 μm/bit in an H-L recording system to measure jitters. In the disk, a reflectance before the recording was 18%, and that after the recording was 2%.

Measurement results of the jitters are shown in FIG. 4. The jitter in the self track in a case where an adjacent track is not recorded is satisfactory, when a groove depth is smaller. When the depth is larger than 50 nm, the jitter in the self track is remarkably deteriorated. On the other hand, in a case where the adjacent track is also recorded, when the groove depth is smaller than 37 nm, the jitter is remarkably deteriorated by an influence of crosstalk. When the groove depth is larger than 43 nm, an increase of the jitter by the influence of the crosstalk cannot be ignored.

As seen from comparison of Comparative Example 1 with Example 1 (comparison of FIG. 3 with FIG. 4), the H-L recording system is different from the L-H recording system in a preferable groove depth, and additionally the jitter can be further reduced in the L-H recording system.

EXAMPLE 2

A disc-shaped PC substrate having a thickness of 1.1 mm was used as a substrate, a 100 nm thick Al reflective film, a 45 nm thick ZnS—SiO$_2$ dielectric layer, a 13 nm thick GeSbTe recording layer, and a 110 nm thick ZnS—SiO$_2$ dielectric layer were stacked in order by sputtering, respectively, and a recording medium (disk) was obtained. It is to be noted that a substrate whose pitch of a guide groove was 0.6 μm and whose depth of the guide groove was 38 nm to 60 nm was used as the PC substrate. Furthermore, a 0.1 mm thick PC film was bonded by an ultraviolet cured resin. An index of refraction of the PC film in a wavelength of 432 nm was 1.6.

After initializing (crystallizing) the disk, the disk was rotated at a linear speed of 5.1 m/s, laser light was applied from the side opposite to that of the substrate using an optical head comprising a laser light source having a wavelength (λ) of 432 nm and an objective lens having NA=0.85, and land/groove recording was performed on a linear density condition of 0.125 λm/bit in an L-H recording system to measure jitters. In the disk, a reflectance before the recording was 5%, and that after the recording was 21%.

Measurement results of the jitters are shown in FIG. 5. The jitter in the self track in which the adjacent track is not recorded is satisfactory, when a groove depth is smaller. When the depth is larger than 54 nm, the jitter in the self track is remarkably deteriorated. On the other hand, in a case where the adjacent track is also recorded, when the groove depth is smaller than 46 nm, the jitter is remarkably deteriorated by an influence of the crosstalk. When the groove depth is set in a range of 46 to 54 nm, that is, in a range of $\lambda/5.86$ nf or more and $\lambda/5$ nf or less, it is possible to obtain satisfactory jitter characteristics including the crosstalk.

EXAMPLE 3

A PC substrate having a thickness of 1.1 mm was used as a substrate, a 100 nm thick Al reflective film, a 65 nm thick ZnS—SiO$_2$ dielectric layer, a 13 nm thick GeSbTe recording layer, and a 150 nm thick ZnS—SiO$_2$ dielectric layer were stacked in order by sputtering, respectively, and a recording medium (disk) was obtained. It is to be noted that a substrate whose pitch of a guide groove was 1.0 μm and whose depth of the guide groove was 62 nm to 98 nm was used as the PC substrate. Furthermore, a 0.1 mm thick PC film was bonded by an ultraviolet cured resin. An index of refraction of the PC film in a wavelength of 660 nm was 1.58.

After initializing (crystallizing) the disk, the disk was rotated at a linear speed of 5.1 m/s, laser light was applied from the side opposite to that of the substrate using an optical head comprising a laser light source having a wavelength ($\lambda$) of 660 nm and an objective lens having NA=0.85, and land/groove recording was performed on a linear density condition of 0.21 μm/bit in an L-H recording system to measure jitters. In the disk, a reflectance before the recording was 6%, and that after the recording was 25%.

As a result of checking of a groove depth by which jitter characteristics including crosstalk are satisfactory in the same manner as in Examples 1 and 2, it has been found that when the groove depth is set in a range of 72 to 83 nm, that is, in a range of $\lambda/5.8$ nf or more and $\lambda/5$ nf or less, it is possible to obtain satisfactory jitter characteristics including the crosstalk.

EXAMPLE 4

A PC substrate having a thickness of 0.6 mm was used as a substrate, a 100 nm thick ZnS—SiO$_2$ dielectric layer, a 15 nm thick GeSbTe recording layer, a 40 nm thick ZnS—SiO$_2$ dielectric layer, and a 100 nm thick reflective film were stacked in order by sputtering, respectively, and a recording medium (disk) was obtained. After forming the Al reflective film, the film was bonded to a 0.6 mm thick dummy PC substrate on which any film was not formed by an ultraviolet cured resin, and thereafter evaluation was performed. It is to be noted that a substrate whose pitch of a guide groove was 0.7 μm and whose depth of the guide groove was 35 nm to 55 nm was used as the PC substrate. An index of refraction (ns) of the PC substrate in a wavelength of 400 nm was 1.6.

After initializing (crystallizing) the disk, the disk was rotated at a linear speed of 5.1 m/s, laser light was applied from the side of the substrate using an optical head comprising a laser light source having a wavelength ($\lambda$) of 400 nm and an objective lens having NA=0.65, and land/groove recording was performed on a linear density condition of 0.152 λm/bit in an L-H recording system to measure jitters. In the disk, a reflectance before the recording was 6%, and that after the recording was 20%.

As a result of the measuring of the jitter, in the same manner as in Example 1, it has been found that when the groove depth is set in a range of 43 to 50 nm, that is, in a range of $\lambda/5.8$ ns or more and $\lambda/5$ ns or less, it is possible to obtain satisfactory jitter characteristics including the crosstalk.

The results of Examples 1 to 4 described above are put together in the following table 1.

TABLE 1

|  | Example 1 | Example 2 | Example 3 | Example 4 |
|---|---|---|---|---|
| Wavelength λ (nm) of laser light | 400 | 432 | 660 | 400 |
| Index nf or ns of refraction of PC film or PC substrate in wavelength λ | 1.6 | 1.6 | 1.58 | 1.6 |
| Allowable groove depth lower limit value d1 (nm) | 43 | 46 | 72 | 43 |
| d1/(λ/nf) or d1/(λ/ns) | 1/5.8 | 1/5.86 | 1/5.8 | 1/5.8 |
| Allowable groove depth upper limit value d2 (nm) | 50 | 54 | 83 | 50 |
| d2/(λ/nf) or d2/(λ/ns) | 1/5 | 1/5 | 1/5 | 1/5 |

As seen from Table 1, when the groove depth is set in a range of $\lambda/5.8$ nf (or $\lambda/5.8$ ns) or more and $\lambda/5$ nf (or $\lambda/5$ ns) or less in any wavelength, satisfactory jitter characteristics including the crosstalk are obtained.

EXAMPLE 5

When $I_1$, $I_2$ and $I_3$ described above were measured using the optical head used in Example 4 with respect to the optical disk used in Example 4, a value of $R=0.5(I_2+I_3)/I_1$ was calculated, and a relation between this value and a jitter was measured, results shown in Table 2 were obtained. It is to be noted that the jitter was obtained by performing recording with respect to all seven adjacent portions including portions corresponding to lands and portions corresponding to grooves of a recording layer of each disk, and obtaining an average of measurements in the portion corresponding to a middle land and the portion corresponding to a middle groove.

TABLE 2

| | $R = 0.5(I_2 + I_3)/I_1$ | | | | | |
|---|---|---|---|---|---|---|
| | 0.5 | 0.55 | 0.6 | 0.7 | 0.75 | 0.7 |
| Jitter (%) | 12 | 9.6 | 9 | 9.3 | 11 | 14 |

As shown in Table 2, satisfactory characteristics were obtained in a range of R of 0.55 to 0.7, and most satisfactory characteristics were obtained especially in a range of 0.6 to 0.7.

Furthermore, also with respect to the optical disks used in Examples 1 to 3, $I_1$, $I_2$ and $I_3$ were measured using the optical head used in each example, a value of $R=0.5(I_2+I_3)/I_1$ was calculated, a relation between this value and the jitter was checked, and then it was confirmed that the value of R was in a range of 0.55 to 0.7 in the optical disk having satisfactory jitter characteristics.

That is, it has been found that the satisfactory characteristics are obtained in a range of R of 0.55 to 0.7 in the optical information recording medium of the L-H recording system, when the NA of the objective lens of the optical head, the laser light wavelength, the thickness of the recording layer, and the index of refraction of the light-transmitting layer or the substrate have various values.

It is to be noted that in the present example, the land width was equal to the groove width, but when the similar measuring was performed in a case where the land width was different from the groove width by about 10%, similar results were obtained with respect to a preferable range of R.

Comparative Example 2

An optical information recording medium of an H-L recording system was prepared using the same PC substrate as that of Example 4, and a relation between R and jitter was checked using the same optical head as that of Example 4. As a result, it was confirmed that a range of R in which the jitter was satisfactory was 0.7 to 0.8, and the preferable range of R was different from that in the L-H recording system. A value of the jitter in the preferable range of R was larger as compared with Example 5.

Therefore, it has been confirmed that the L-H recording system is suitable for raising a recording density.

Industrial Applicability:

As described above, according to the present invention, it is possible to perform land/groove recording with respect to an L-H system optical information recording medium having a high signal quality using a high-NA optical head with a high recording density.

The invention claimed is:

1. An optical information recording medium in which light is projected in a spot to thereby record/reproduce information and in which at least a recording layer and a light-transmitting layer are disposed in this order on a substrate having a guide groove for tracking of the spotted light and in which the light is projected in the spot to the recording layer from the side of the light-transmitting layer to record the information both in a first portion of the recording layer corresponding to the inside of the guide groove and a second portion of the recording layer corresponding to a flat portion between mutually adjacent guide grooves, wherein assuming that a wavelength of the light is $\lambda$, and an index of refraction of the light-transmitting layer in the wavelength $\lambda$ is nf, a depth d of the first portion with respect to the second portion in the surface of the recording layer on the side of the light-transmitting layer satisfies a relation of $\lambda/5.8$ nf $\leq$ d $\leq \lambda/5$ nf, and a reflectance of the recording layer after the recording is larger than that before the recording.

2. The optical information recording medium according to claim 1, wherein the depth d is substantially equal to a depth of the inside of the guide groove with respect to the flat portion between the guide grooves.

3. The optical information recording medium according to claim 1, wherein a dielectric layer exists between the substrate and the recording layer.

4. The optical information recording medium according to claim 3, wherein a reflective film exists between the substrate and the dielectric layer.

5. The optical information recording medium according to claim 1, wherein a dielectric layer exists between the recording layer and the light-transmitting layer.

6. An optical information recording medium in which light is projected in a spot to thereby record/reproduce information and in which at least a recording layer is disposed on a substrate having a guide groove for tracking of the spotted light and in which the light is projected in the spot to the recording layer from the side of the substrate to record the information both in a first portion of the recording layer corresponding to the inside of the guide groove and a second portion of the recording layer corresponding to a flat portion between mutually adjacent guide grooves, wherein assuming that a wavelength of the light is 1, and an index of refraction of the substrate in the wavelength 1 is ns, a depth D of the second portion with respect to the first portion in the surface of the recording layer on the side of the substrate satisfies a relation of 1/5.8 ns $\leq$ D $\leq$ 1/5 ns, and a reflectance of the recording layer after the recording is larger than that before the recording.

7. The optical information recording medium according to claim 6, wherein the depth D is substantially equal to a depth of the inside of the guide groove with respect to the flat portion between the guide grooves.

8. The optical information recording medium according to claim 6, wherein a reflective film exists on the side of the recording layer opposite to the substrate.

9. The optical information recording medium according to claim 6, wherein a dielectric layer exists between the substrate and the recording layer.

10. An optical information recording medium in which light is projected in a spot to thereby record/reproduce information and in which at least a recording layer is disposed on a substrate having a guide groove for tracking of the spotted light and in which the information is recorded both in a first portion of the recording layer corresponding to the inside of the guide groove and a second portion of the recording layer corresponding to a flat portion between mutually adjacent guide grooves, wherein assuming that: a quantity of reflected light at a time when the light is applied to a non-recording region in which alternate arrangement of the guide groove and the flat portion between the guide grooves is not formed is I1; and quantities of the reflected light at a time when the light is applied to a portion corresponding to the inside of the guide groove and a portion corresponding to the flat portion between the guide grooves in an information non-recorded state on the same conditions are I2 and I3, respectively, a value of $R=0.5(I2+I3)/I1$ is 0.55 to 0.7, and a reflectance of the recording layer after the recording is larger than that before the recording.

11. The optical information recording medium according to claim 10, wherein a dielectric layer exists between the substrate and the recording layer.

12. The optical information recording medium according to claim 11, wherein a reflective film exists between the substrate and the dielectric layer.

13. The optical information recording medium according to claim 10, wherein a dielectric layer exists on the side of the recording layer opposite to the substrate.

14. The optical information recording medium according to claim 13, wherein a reflective film exists on the side of the dielectric layer opposite to the recording layer.

15. An optical information recording/reproducing method having the step of projecting light having a wavelength of 390 to 440 nm in a spot to both a first portion and a second portion of a recording layer of the optical information recording medium according to claim 1 using an objective lens having a numerical aperture of 0.8 to 0.9 to thereby record/reproduce information.

16. An optical information recording/reproducing device having an optical head which projects light in a spot to both a first portion and a second portion of a recording layer of the optical information recording medium according to claim 1, the optical head having a semiconductor laser which emits light having a wavelength of 390 to 440 nm and an objective lens having a numerical aperture of 0.8 to 0.9.

* * * * *